(12) United States Patent
Mikami

(10) Patent No.: US 10,317,780 B2
(45) Date of Patent: Jun. 11, 2019

(54) MIRROR DRIVE DEVICE EQUIPPED IN IMAGE PICKUP APPARATUS, AND IMAGE PICKUP APPARATUS

(71) Applicant: CANON KABUSHIKI KAISHA, Tokyo (JP)

(72) Inventor: Natsu Mikami, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 15/657,708

(22) Filed: Jul. 24, 2017

(65) Prior Publication Data

US 2018/0031953 A1 Feb. 1, 2018

(30) Foreign Application Priority Data

Jul. 29, 2016 (JP) ................................ 2016-149845

(51) Int. Cl.
  *G02B 26/08* (2006.01)
  *G03B 19/12* (2006.01)
  *H04N 5/225* (2006.01)

(52) U.S. Cl.
  CPC ...... *G03B 19/12* (2013.01); *G03B 2205/0053* (2013.01); *G03B 2217/002* (2013.01); *H04N 5/2254* (2013.01)

(58) Field of Classification Search
  CPC ............ G03B 19/12; G03B 2205/0053; G03B 2217/002; H04N 5/2254

USPC ....................................................... 359/221.2
See application file for complete search history.

(56) References Cited

U.S. PATENT DOCUMENTS

| 8,079,720 B2 | 12/2011 | Negita |
| 2010/0054727 A1* | 3/2010 | Okutani ................... G03B 9/42 396/466 |

FOREIGN PATENT DOCUMENTS

| JP | S6232430 A | 2/1987 |
| JP | 2009288513 A | 12/2009 |

* cited by examiner

*Primary Examiner* — Euncha P Cherry
(74) *Attorney, Agent, or Firm* — Rossi, Kimms & McDowell LLP

(57) ABSTRACT

A mirror drive device capable of achieving high responsiveness and driving stability, and suppressing mirror bounce. The mirror drive device includes a mirror box. A main mirror holder has a main mirror rotating shaft rotatably supported by the mirror box, and rotatably holds a main mirror between a mirror-down position and a mirror-up position, A sub mirror holder has a sub mirror rotating shaft rotatably supported by the mirror box, and rotatably holds a sub mirror between a mirror-down position and a mirror-up position. The main mirror holder and the sub mirror holder are connected by at least one connecting member. A drive member is engaged with the connecting member, and is driven for rotation by a motor. The sub mirror holder is directly driven by the drive member, and the main mirror holder is driven by the drive member via the connecting member.

14 Claims, 11 Drawing Sheets

MIRROR DRIVE DEVICE EQUIPPED IN IMAGE PICKUP APPARATUS, AND IMAGE PICKUP APPARATUS

BACKGROUND OF THE INVENTION

Field of the Invention

The present invention relates to a mirror drive device equipped in an image pickup apparatus.

Description of the Related Art

In a single-lens reflex camera, there are arranged a main mirror that reflects an incident light flux, and guides the reflected light flux to a viewfinder optical system, and a sub mirror that guides the incident light flux having transmitted through the main mirror to a focus detection device. Before shooting, the mirrors are brought into contact with a stopper disposed in a mirror box, thereby being set to respective predetermined stop positions where the mirrors block respective predetermined photographing optical paths to guide the incident light flux to the viewfinder optical system and the focus detection device, respectively. On the other hand, during shooting, a mirror drive mechanism, i.e. a so-called quick return mechanism, drives the mirrors for rotation to thereby retract both the mirrors from the photographing optical paths, and returns the mirrors to the stop positions within the respective photographing optical paths again after termination of shooting.

In this mirror drive mechanism, when the mirrors are rotated to return the mirrors from the respective positions retracted from the photographing optical paths to the positions in the photographing optical paths, respectively, it is necessary to suppress bouncing of each mirror, caused by abutment with the associated stopper. This is to quickly start a focus detection operation by stabilizing a viewfinder image through suppression of bouncing of the main mirror. Further, by reducing the mirror bounce time, it is possible to reduce the mirror driving time by a time period corresponding to the reduction, and thereby improve the continuous shooting speed.

As a conventional mirror drive mechanism, there has been known one having a structure in which a rotating shaft of the main mirror is provided in the mirror box, a rotating shaft of the sub mirror is provided on the main mirror, and the rotating shaft of the sub mirror is moved in accordance with rotation of the main mirror. This structure has a problem that when the main mirror bounces, the sub mirror also bounces.

To solve this problem, in Japanese Laid-Open Patent Publication (Kokai) No. S62-32430, there has been proposed a mirror drive device in which the rotating shaft of a sub mirror holder that holds the sub mirror is rotatably arranged in the mirror box to thereby stabilize the position of the sub mirror. Further, in Japanese Laid-Open Patent Publication (Kokai) No. 2009-288513, there has been proposed a mirror drive mechanism in which a shaft protrudingly provided on a main mirror holder moves along an edge of the sub mirror holder including the rotating shaft rotatably arranged in the mirror box to thereby push up the sub mirror.

However, the technique described in Japanese Laid-Open Patent Publication (Kokai) No. S62-32430 defines a structure in which a driving force transmitted to the main mirror is transmitted to the sub mirror by a complicated mechanism via a four-joint link and a cam, which causes a problem that the responsiveness of the sub mirror is low. Further, the position of the sub mirror is restricted by the urging force of a spring during a mirror-up operation, and hence even when a motor for rotating the rotating shaft is stopped, mirror bounce may be caused when the sub mirror is brought into abutment with the stopper. Further, the main mirror is also rotated by another four-joint link mechanism while swinging back, and hence the driving of the main mirror may not be stable, compared with the configuration in which the rotating shaft is rotatably supported in the mirror box.

Further, in the technique described in Japanese Laid-Open Patent Publication (Kokai) No. 2009-288513, the position of the sub mirror holder is restricted only as to one side thereof, and hence there is a possibility that the responsiveness is lowered during a mirror-down operation, and as a result, when the sub mirror is brought into abutment with the stopper, mirror bounce is liable to occur. Further, the mirror drive device described in Japanese Laid-Open Patent Publication (Kokai) No. 2009-288513 also is configured such that the main mirror holder is rotated by the four-joint link mechanism, and hence there is a possibility that the driving of the main mirror is not stable.

SUMMARY OF THE INVENTION

The present invention provides a mirror drive device that is capable of achieving high responsiveness and driving stability, and suppressing mirror bounce, and an image pickup apparatus equipped with the mirror drive device.

In a first aspect of the present invention, there is provided a mirror drive device comprising a support member, a main mirror, a main mirror holder that has a main mirror rotating shaft rotatably supported by the support member, and holds the main mirror in a manner rotatable between a first position and a second position, a sub mirror, a sub mirror holder that has a sub mirror rotating shaft rotatably supported by the support member, and holds the sub mirror in a manner rotatable between a third position and a fourth position, at least one connecting member that connects the main mirror holder and the sub mirror holder, and a drive member that is engaged with the connecting member, and is driven for rotation by a motor, wherein the sub mirror holder is directly driven by the drive member, and the main mirror holder is driven by the drive member via the connecting member.

In a second aspect of the present invention, there is provided an image pickup apparatus comprising a camera body, a mirror box that is arranged on a photographing optical path of the camera body, a main mirror, a main mirror holder that has a main mirror rotating shaft rotatably supported by the mirror box, and holds the main mirror in a manner rotatable between a mirror-down position where the main mirror blocks the photographing optical path and a mirror-up position where the main mirror is retracted from the photographing optical path, a sub mirror, a sub mirror holder that has a sub mirror rotating shaft rotatably supported by the mirror box, and holds the sub mirror in a manner rotatable between a mirror-down position where the sub mirror blocks the photographing optical path and a mirror-up position where the sub mirror is retracted from the photographing optical path, at least one connecting member that connects the main mirror holder and the sub mirror holder, a motor that outputs a rotational driving force, and a drive member that is engaged with the connecting member and is driven for rotation by the motor, wherein the sub mirror holder is directly driven by the drive member to rotate between the mirror-down position and the mirror-up position, and the main mirror holder is driven by the drive member via the connecting member to rotate between the mirror-down position and the mirror-up position.

In a third aspect of the present invention, there is provided an image pickup apparatus comprising a support member, a first mirror, a first mirror holder that has a first rotational shaft rotatably supported by the support member, and holds the first mirror, a second mirror, a second mirror holder that has a second rotating shaft rotatably supported by the support member, and holds the second mirror, a connecting member that connects the first mirror holder and the second mirror holder, and a drive member that is driven for rotation by a motor, wherein the connecting member includes a first connecting portion connected to the first mirror holder, and a second connecting portion connected to the second mirror holder, and the first connecting portion and the second connecting portion are fixed to respective predetermined locations of the connecting member, wherein the first mirror holder is rotated about the first rotating shaft by the connecting member being moved by being urged by the drive member, and wherein the second mirror holder is rotated about the second rotating shaft by being urged by the drive member.

According to the present invention, it is possible to provide a mirror drive device that is capable of achieving high responsiveness and driving stability, and suppressing mirror bounce.

Further features of the present invention will become apparent from the following description of exemplary embodiments (with reference to the attached drawings).

DESCRIPTION OF THE EMBODIMENTS

Figure 1A:
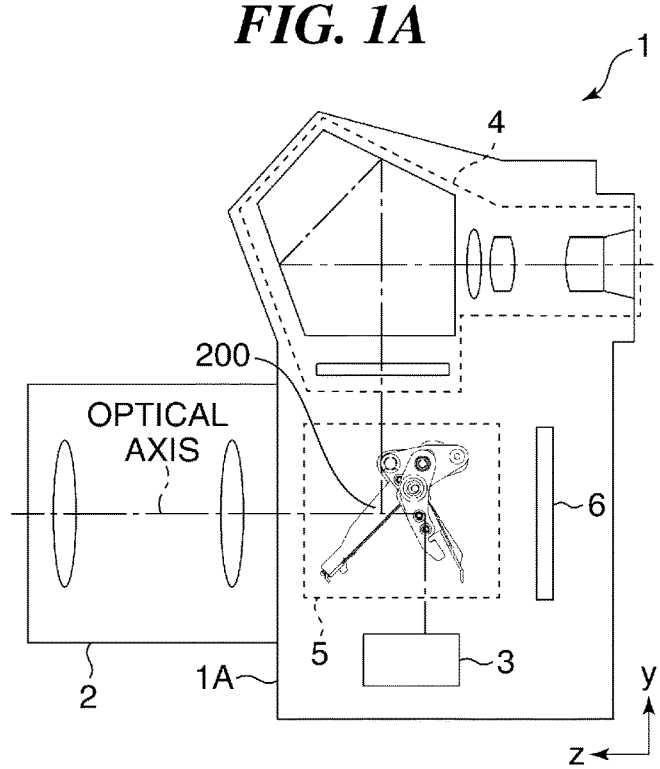
FIGS. 1A and 1B are schematic cross-sectional views of an image pickup apparatus equipped with a mirror drive device according to an embodiment of the present invention.
Figure 1B:
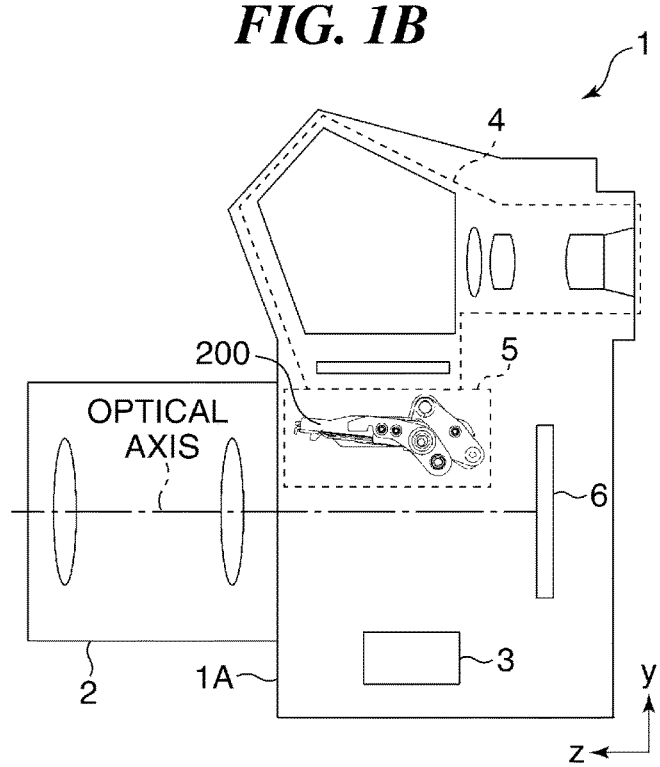
Figure 2:
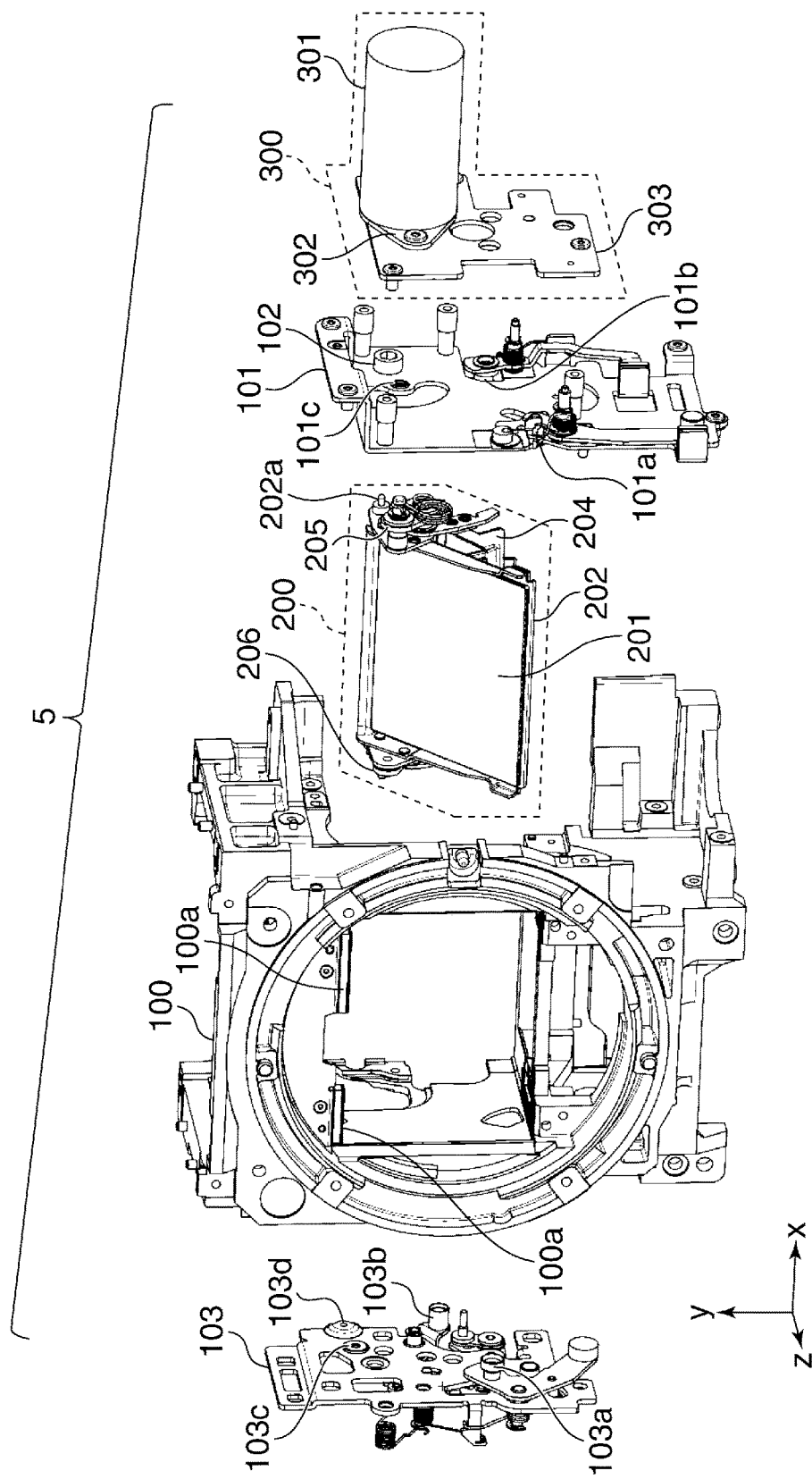
FIG. 2 is an exploded perspective view of the mirror drive device.

The present invention will now be described in detail below with reference to the accompanying drawings showing embodiments thereof. FIGS. 1A and 1B are schematic cross-sectional views of an image pickup apparatus 1 equipped with a mirror drive device 5 according to an embodiment of the present invention, with the mirror drive device 5 in a mirror-down position, and in a mirror-up position, respectively. FIG. 2 is an exploded perspective view of the mirror drive device 5.

The image pickup apparatus 1 is a digital single-lens reflex camera, and includes a camera body 1A and an interchangeable lens 2 (lens barrel) that can be mounted on and removed from the camera body 1A. The camera body 1A includes a focus detection unit 3, an optical viewfinder unit 4, the mirror drive device 5, and an image pickup sensor 6. The mirror drive device 5 is provided with a mirror unit 200. The mirror unit 200 includes a main mirror 201, a main mirror holder 202 that holds the main mirror 201, a sub mirror 203 (see FIG. 3A), and a sub mirror holder 204 that holds the sub mirror 203. The main mirror holder 202 and the sub mirror holder 204 are rotatably mounted in a mirror box 100 (support member). The mirror drive device 5 rotates the main mirror 201 (specifically the main mirror holder 202) between a mirror-down position (first position) and a mirror-up position (second position). Further, the mirror drive device 5 rotates the sub mirror 203 (specifically the sub mirror holder 204) between the mirror-down position (third position) and the mirror-up position (fourth position).

In the state shown in FIG. 1A, the mirror unit 200 is in the mirror-down state (i.e. the main mirror holder 202 and the sub mirror holder 204 are in the respective mirror-down positions), and is positioned within a photographing optical path. In this state, an incident light flux having passed through the interchangeable lens 2 is separated by the main mirror 201 formed by a half mirror, and the incident light flux reflected by the main mirror 201 is guided to a pentaprism of the optical viewfinder unit 4. On the other hand, the light flux having transmitted through the main mirror 201 is reflected by the sub mirror 203, and is guided to the focus detection unit 3. Therefore, when the mirror unit 200 is in the mirror-down position, the incident light flux having passed through the interchangeable lens 2 is not guided to the image pickup sensor 6.

In the state shown in FIG. 1B, in which the mirror unit 200 is in the mirror-up position (i.e. the main mirror holder 202 and the sub mirror holder 204 are in the mirror-up position), the mirror unit 200 is moved to above the photographing optical path to be retracted from the photographing optical path. At this time, the sub mirror holder 204 is moved to an upper space of the mirror box 100, in a state overlaid on the main mirror holder 202. In this state, an incident light flux having passed through the interchangeable lens 2 is guided to the image pickup sensor 6 to form an image on a light receiving surface of the image pickup sensor 6 without being guided to the optical viewfinder unit 4 and the focus detection unit 3. Thus, the mirror drive device 5 moves the main mirror holder 202 and the sub mirror holder 204 between the mirror-down position and the mirror-up position.

As shown in FIGS. 1A and 1B, and FIG. 2, a direction of an optical axis of the interchangeable lens 2 is defined as a z-axis direction, a vertical direction of the image pickup apparatus 1 is defined as a y-axis direction, and a direction orthogonal to both of the z-axis direction and the y-axis direction is defined as an x-axis direction, whereby the following description is given by referring to these directions, as required.

The mirror drive device 5 includes not only the mirror unit 200, but also the mirror box 100, a side plate 101, an adjustment plate 103, and a mirror motor unit 300. The side plate 101 is fixed to one side of the mirror box 100, which extends orthogonal to the x-axis direction, and the adjustment plate 103 is fixed to the other side of the mirror box 100, which extends orthogonal to the x-axis direction. That is, the side plate 101 and the adjustment plate 103 are attached to the mirror box 100 in a manner opposed to each other in the x-axis direction. The side plate 101 includes a main mirror-cushioning shaft 101a, a sub mirror-positioning shaft 101b, a sub mirror rotating shaft bearing 101c, and a main mirror rotating shaft bearing 102. The adjustment plate 103 includes a main mirror-cushioning shaft 103a, a sub mirror-positioning shaft 103b, a sub mirror rotating shaft bearing 103c, and a main mirror rotating shaft bearing hole 103d.

The main mirror-cushioning shafts 101a and 103a, and the sub mirror-positioning shafts 101b and 103b are formed as eccentric pins. By rotating the main mirror-cushioning shafts 101a and 103a about the x-axis, it is possible to adjust a mirror angle at which the main mirror holder 202 is brought into contact with the main mirror-cushioning shafts 101a and 103a. Further, by rotating the sub mirror-positioning shafts 101b and 103b about the x-axis, it is possible to adjust a mirror angle at which the sub mirror holder 204 is brought into contact with the sub mirror-positioning shafts 101b and 103b. The main mirror rotating shaft bearing 102 is also formed as an eccentric bearing, and by rotating the main mirror rotating shaft bearing 102 about the x-axis, it is possible to adjust the position of a first rotating shaft 202a of the main mirror holder 202 on a y-z plane. These will be described in detail hereinafter.

Figure 5:
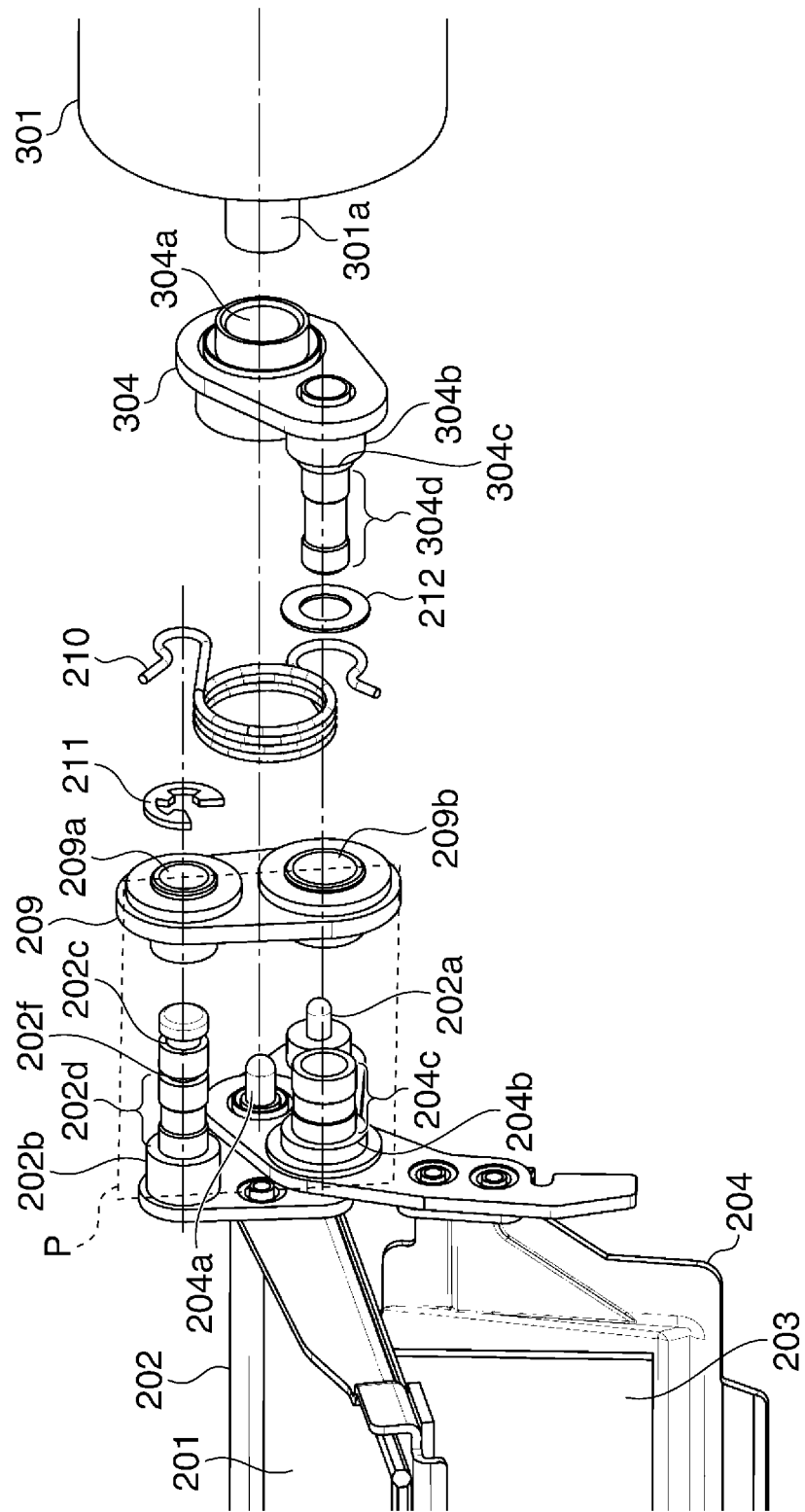
FIG. 5 is an exploded perspective view of a first mirror drive link unit as a component of the mirror drive device.

The mirror motor unit 300 includes a motor 301, a motor flange 302, a motor base 303, and a drive member 304 (see FIG. 5). The motor 301 is fixed to the motor base 303 via the motor flange 302. The motor base 303 is fixed to the side plate 101.

Figure 3A:
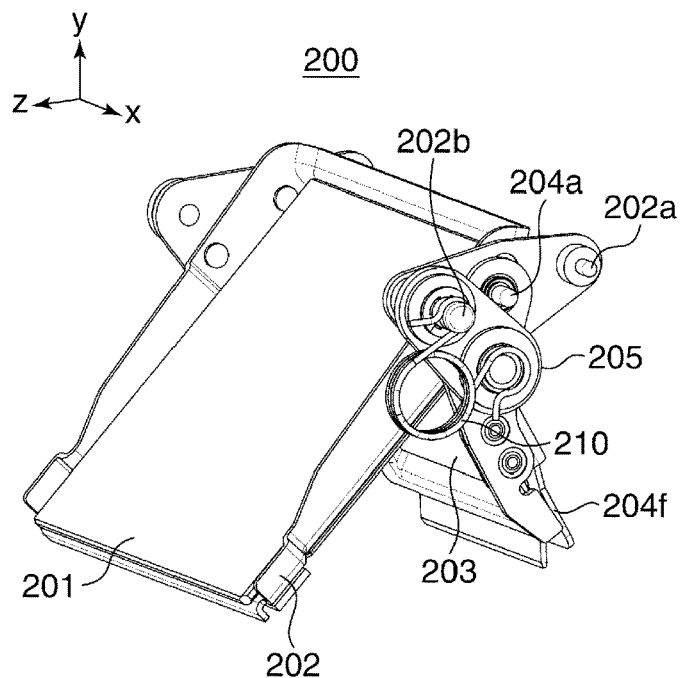
FIGS. 3A and 3B are perspective views of a mirror unit as a component of the mirror drive device.
Figure 3B:
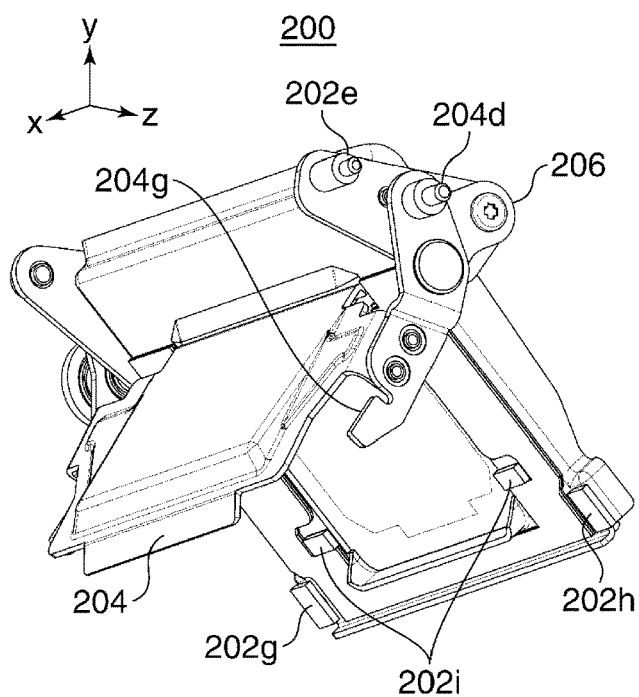

FIG. 3A is a perspective view showing a structure of the mirror unit 200, as viewed from the main mirror 201. FIG. 3B is a perspective view showing the structure of the mirror unit 200, as viewed from the sub mirror 203. The mirror unit 200 includes not only the main mirror 201, the main mirror holder 202, the sub mirror 203, and the sub mirror holder 204, but also a first mirror drive link unit 205 and a second mirror drive link unit 206.

The main mirror holder 202 is formed with the first rotating shaft 202a and a second rotating shaft 202e, which are main mirror rotating shafts. The first rotating shaft 202a is rotatably supported by the main mirror rotating shaft bearing 102 of the side plate 101. The second rotating shaft 202e is rotatably supported by the main mirror rotating shaft bearing hole 103d of the adjustment plate 103. The main mirror holder 202 is formed with a first contact portion 202g. When the main mirror 201 is in the mirror-down position, the first contact portion 202g is in contact with the main mirror-cushioning shaft 101a of the side plate 101. The main mirror holder 202 is also formed with a second contact portion 202h. When the main mirror 201 is in the mirror-down position, the second contact portion 202h is in contact with the main mirror-cushioning shaft 103a of the adjustment plate 103. When the main mirror 201 is in the mirror-up position, a front end portion of a side of the main mirror holder 202, on which the main mirror 201 is held, is in contact with mirror-up stoppers 100a (see FIG. 2), provided in the mirror box 100 (see FIG. 11B).

Figure 4:
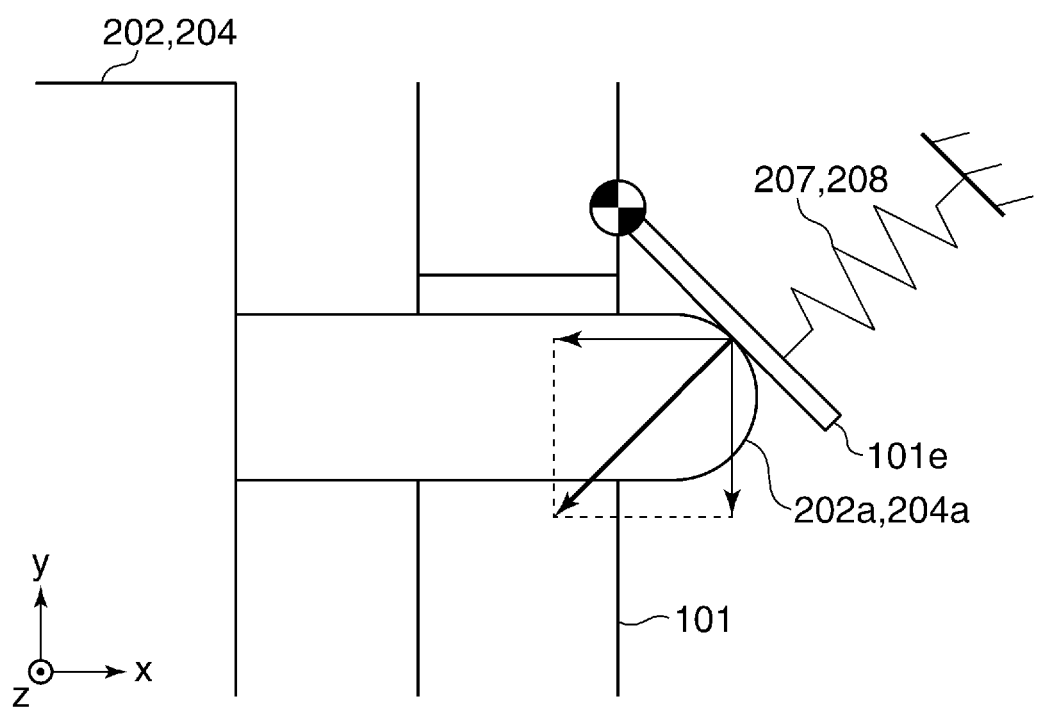
FIG. 4 is a schematic view useful in explaining looseness elimination of a main mirror holder in the mirror unit.

It is desirable that in the main mirror holder 202, looseness of the first rotating shaft 202a is eliminated. FIG. 4 is a schematic view useful in explaining elimination of looseness of the first rotating shaft 202a of the main mirror holder 202. A looseness elimination plate 101e is disposed on the side plate 101 in a manner rotatable about the z-axis. Further, one end of a first looseness elimination spring 207 is brought into contact with the looseness elimination plate 101e, and the other end of the same is fixed e.g. to the side plate 101. With this arrangement, the looseness elimination plate 101e is brought into contact with the first rotating shaft 202a to thereby urge the first rotating shaft 202a in the x-axis direction and the y-axis direction. Thus, looseness, on an x-y plane, of a portion where the first rotating shaft 202a is fitted in the main mirror rotating shaft bearing 102, and looseness between the main mirror holder 202 and the mirror box 100 in the x-axis direction can be eliminated. Although in the present example, the description is given of the arrangement in which the first rotating shaft 202a is urged in the x-axis direction and the y-axis direction, the first rotating shaft 202a may be urged in the x-axis direction and the z-axis direction.

The sub mirror holder 204 is formed with a first rotating shaft 204a and a second rotating shaft 204d, which are sub mirror rotating shafts. The first rotating shaft 204a is rotatably supported by the sub mirror rotating shaft bearing 101c of the side plate 101. A thickness of the sub mirror rotating shaft bearing 101c in the x-axis direction is larger than that of the side plate 101. With this arrangement, compared with an arrangement in which the first rotating shaft 204a is directly received by a cut surface of the side plate 101, a contact area with the first rotating shaft 204a is increased, which makes it possible to improve the durability. The second rotating shaft 204d is rotatably supported by the sub mirror rotating shaft bearing 103c of the adjustment plate 103. A thickness of the sub mirror rotating shaft bearing 103c in the x-axis direction is larger than that of the adjustment plate 103. With this arrangement, compared with an arrangement in which the second rotating shaft 204d is directly received by a cut surface of the adjustment plate 103, a contact area with the second rotating shaft 204d is increased, which makes it possible to improve the durability.

The sub mirror holder 204 is formed with a first contact portion 204f and a second contact portion 204g. When the sub mirror 203 is in the mirror-down position, the first contact portion 204f is in contact with the sub mirror-positioning shaft 101b of the side plate 101, and the second contact portion 204g is in contact with the sub mirror-positioning shaft 103b of the adjustment plate 103. When the sub mirror 203 is in the mirror-up position, a front end portion of a side of the sub mirror holder 204, on which the sub mirror 203 is held, is in contact with sub mirror contact portions 202i of the main mirror holder 202.

It is desirable that in the sub mirror holder 204, looseness of the first rotating shaft 204a is eliminated, and to eliminate looseness of the sub mirror holder 204, an arrangement similar to that of the main mirror holder 202, described with reference to FIG. 4, can be used. More specifically, as shown in FIG. 4, the looseness elimination plate 101e is provided on the side plate 101 in a manner rotatable about the z-axis. Further, one end of a second looseness elimination spring 208 is brought into contact with the looseness elimination plate 101e, and the other end of the same is fixed e.g. to the side plate 101. With this arrangement, the looseness elimination plate 101e is brought into contact with the first rotating shaft 204a of the sub mirror holder 204 to thereby urge the first rotating shaft 204a in the x-axis direction and the y-axis direction. Thus, looseness, on an x-y plane, of a portion where the first rotating shaft 204a is fitted in the sub mirror rotating shaft bearing 101c, and looseness between the sub mirror holder 204 and the mirror box 100 in the x-axis direction can be eliminated. Although in the present example, the description is given of the arrangement in which the first rotating shaft 204a is urged in the x-axis direction and the y-axis direction, the first rotating shaft 204a may be urged in the x-axis direction and the z-axis direction.

FIG. 5 is an exploded perspective view of the first mirror drive link unit 205. A first mirror drive link 209 as one of connecting members includes a main mirror-connecting portion 209a (first connecting portion) and a sub mirror-connecting portion 209b (second connecting portion). The main mirror-connecting portion 209a is fitted on a fitting portion 202d formed on a main mirror drive shaft 202b of the main mirror holder 202 to thereby connect the main mirror holder 202 and the first mirror drive link 209. Further, to prevent the first mirror drive link 209 from being removed from the main mirror drive shaft 202b, an E looseness preventing ring 211 is engaged in a looseness preventing ring engagement groove 202f of the main mirror drive shaft 202b. An inner diameter portion of the sub mirror-connecting portion 209b is fitted on an outer diameter portion of a fitting portion 204c of a sub mirror drive shaft 204b provided on the sub mirror holder 204 in a rotatable and slidable manner. Further, an inner diameter portion of the fitting portion 204c of the sub mirror drive shaft 204b is fitted on a fitting portion 304d of a drive lever 304b provided on the drive member 304 in a rotatable and slidable manner.

An output shaft 301a of the motor 301 is inserted and fixed in a motor engagement hole 304a of the drive member 304. The output shaft 301a of the motor 301, and the first rotating shaft 204a and the second rotating shaft 204d of the sub mirror holder 204 are substantially coaxially arranged, as viewed from the x-axis direction. Since the drive lever 304b of the drive member 304 and the sub mirror drive shaft 204b of the sub mirror holder 204 are connected, by driving the motor 301 to rotate the drive member 304, it is possible to drive the sub mirror holder 204. The rotation angle of the motor 301 and the rotation angle of the sub mirror holder 204 correspond to each other in one-to-one relation. Therefore, when the motor 301 stops with a predetermined stopping accuracy, the sub mirror holder 204 also stops with the predetermined stopping accuracy.

A spring holding washer 212 is fitted on the drive lever 304b. The spring holding washer 212 is inserted at a boundary between a looseness eliminating spring engagement portion 304c and the fitting portion 304d of the drive lever 304b. A third looseness eliminating spring 210 as an urging member is disposed such that it is engaged in a looseness elimination spring engagement groove 202c of the main mirror holder 202 and with the looseness elimination spring engagement portion 304c of the drive member 304. The third looseness eliminating spring 210 urges the main mirror drive shaft 202b of the main mirror holder 202 and the drive lever 304b of the drive member 304 outward in a longitudinal direction of the first mirror drive link 209 (in directions away from each other), respectively. Note that the longitudinal direction of the first mirror drive link 209 refers to a direction connecting the center of the main mirror-connecting portion 209a and the center of the sub mirror-connecting portion 209b. The spring holding washer 212 prevents the third looseness eliminating spring 210 from being brought into contact with the sub mirror drive shaft 204b of the sub mirror holder 204 and the sub mirror-connecting portion 209b of the first mirror drive link 209 during driving of the mirror drive device 5.

Figure 6:
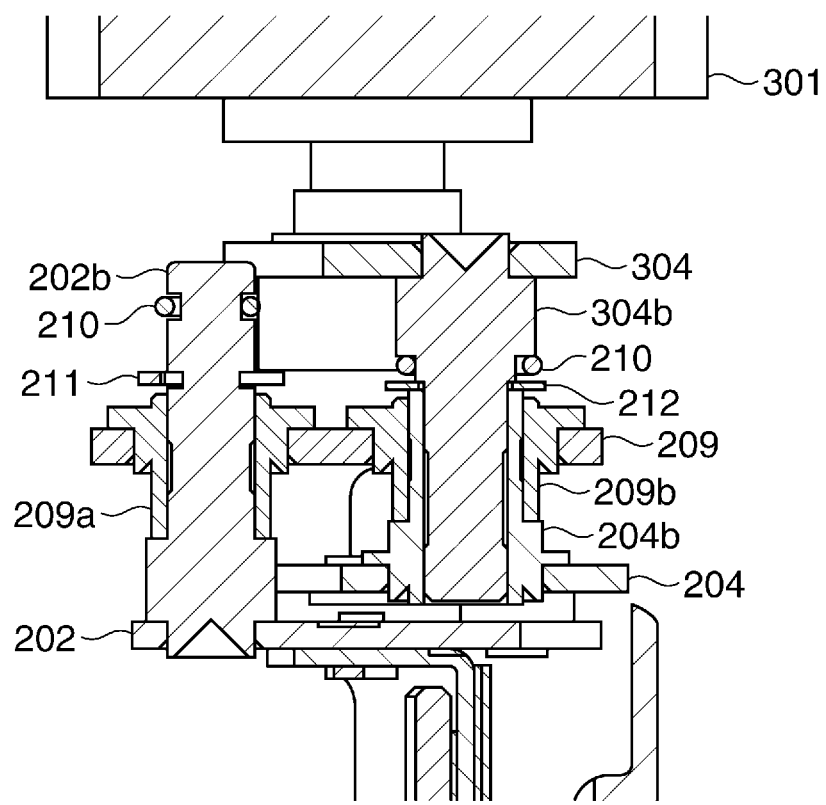
FIG. 6 is a cross-sectional view taken along plane P in FIG. 5.

FIG. 6 is a cross-sectional view taken along a plane P in FIG. 5 (plane passing through the central axis of the main mirror drive shaft 202b of the main mirror holder 202 and the central axis of the drive lever 304b of the drive member 304). The main mirror drive shaft 202b is brought into contact with an inner diameter portion of the main mirror-connecting portion 209a formed in the first mirror drive link 209 by receiving a force from the third looseness eliminating spring 210 toward the left, as viewed in FIG. 6. The drive lever 304b is brought into contact with an inner diameter portion of the sub mirror-drive shaft 204b of the sub mirror holder 204 by receiving a force from the third looseness eliminating spring 210 toward the right, as viewed in FIG. 6. The sub mirror-drive shaft 204b of the sub mirror holder 204 is brought into contact with an inner diameter portion of the sub mirror-connecting portion 209b formed in the first mirror drive link 209 by receiving a force from the drive lever 304b toward the right, as viewed in FIG. 6. Thus, it is possible to realize looseness elimination at three respective points between the main mirror drive shaft 202b and the main mirror-connecting portion 209a, the drive lever 304b and the sub mirror drive shaft 204b, and the sub mirror drive shaft 204b and the sub mirror-connecting portion 209b, by using the third looseness elimination spring 210. In a case where a torsion spring is used as the third looseness elimination spring 210, to prevent the third looseness elimination spring 210 from being removed during driving of the mirror drive device 5, it is desirable that the third looseness elimination spring 210 has a coil diameter of a coiled portion thereof made larger than an inter-axial distance between the main mirror drive shaft 202b and the drive lever 304b.

Figure 7A:
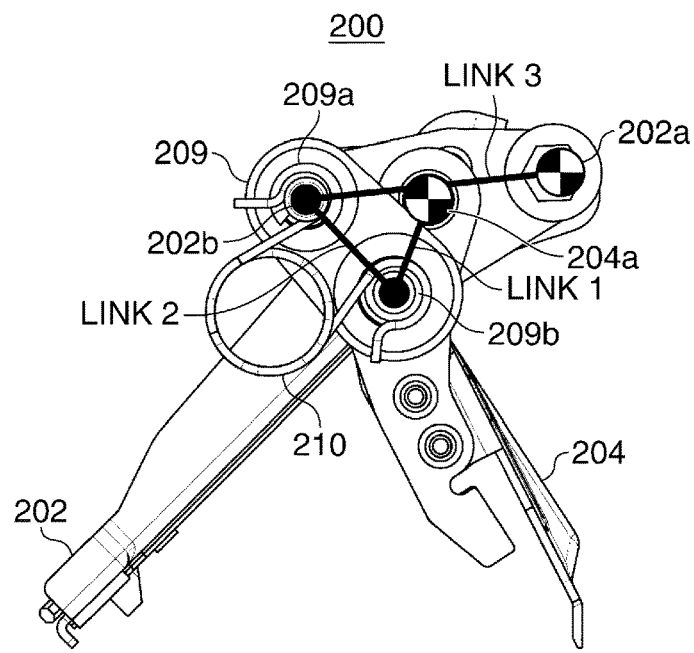
FIGS. 7A and 7B are a side view and a partial enlarged view of the mirror unit, respectively.

FIG. 7A is a side view of the mirror unit 200, as viewed from the x-axis direction. In the mirror unit 200, a four-joint link mechanism of the first mirror drive link unit 205 is formed by the main mirror holder 202, the sub mirror holder 204, the first mirror drive link 209, and the side plate 101 (not shown in FIG. 7A). FIG. 7A schematically shows the four-joint link mechanism of the first mirror drive link unit 205 having links 1, 2, and 3 by thick solid lines. The link 1 is formed by part of the sub mirror holder 204, and is defined as a straight line connecting between the central axis of the first rotating shaft 204a of the sub mirror holder 204 and the central axis of the sub mirror drive shaft 204b of the sub mirror holder 204 (i.e. the center of the sub mirror-connecting portion 209b). The link 2 is defined as a straight line connecting between the central axis of the main mirror-connecting portion 209a of the first mirror drive link 209 and the central axis of the sub mirror-connecting portion 209b. That is, the first mirror drive link 209 connecting between the main mirror holder 202 and the sub mirror holder 204 is the link 2. The link 3 is formed by part of the main mirror holder 202, and is defined as a straight line connecting between the first rotating shaft 202a of the main mirror holder 202 and the main mirror drive shaft 202b (i.e. the center of the main mirror-connecting portion 209a).

As described above, in the mirror driving device 5, the main mirror holder 202 is driven by the drive member 304 via the first mirror drive link 209. Further, the sub mirror holder 204 is directly driven by the drive member 304. With the simplified arrangement as described above, it is possible to suppress the driving of the mirror driving device 5 from being affected by looseness between the components, to thereby achieve high responsiveness thereof.

Figure 7B:
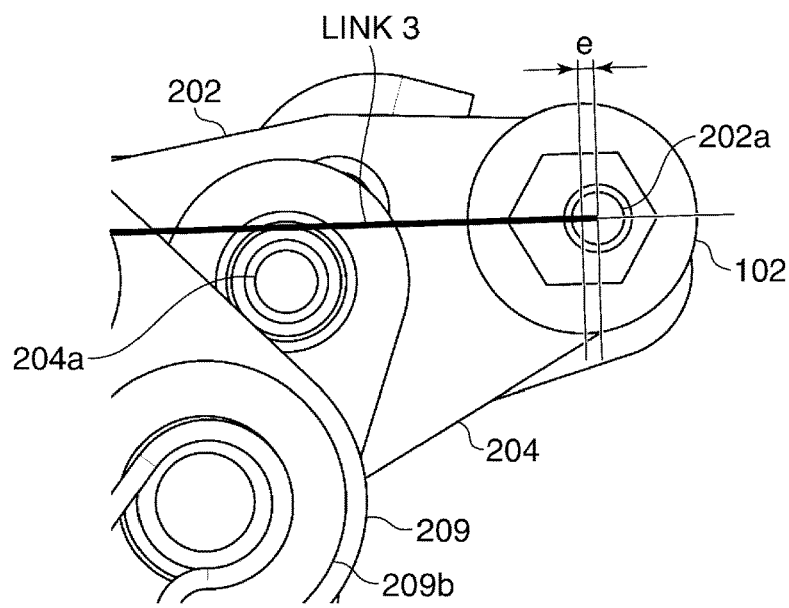

FIG. 7B is a partial enlarged view of the mirror unit 200, illustrating a structure of the first rotating shaft 202a of the main mirror holder 202 and the main mirror rotating shaft bearing 102, and components therearound. The main mirror rotating shaft bearing 102 is eccentric by an eccentric amount "e" in a direction of the link 3. Although in FIG. 7B, the main mirror rotating shaft bearing 102 is eccentric with respect to the central axis thereof toward an opposite side (substantially right side as viewed in FIG. 7B) from the main mirror drive shaft 202b (see FIG. 7A), the main mirror rotating shaft bearing 102 may be eccentric toward the main mirror drive shaft 202b (substantially left side as viewed in FIG. 7B).

Figure 8A:
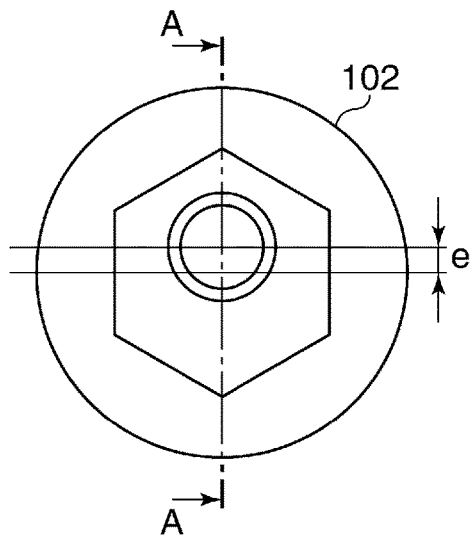
FIGS. 8A and 8B are a front view and a cross-sectional view of a main mirror rotating shaft bearing provided on a side plate as a component of the mirror drive device, respectively.
Figure 8B:
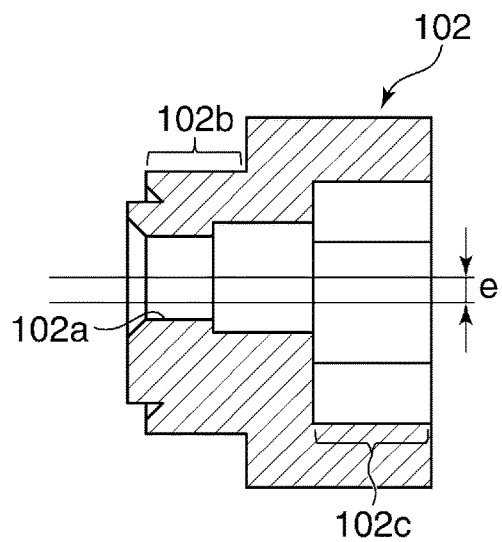

FIG. 8A is a front view of the main mirror rotating shaft bearing 102. FIG. 8B is a cross-sectional view taken along A-A in FIG. 8A. The main mirror rotating shaft bearing 102 has a bearing portion 102a, a fixed portion 102b, and a hexagonal hole 102c. The bearing portion 102a is fitted on the first rotating shaft 202a of the main mirror holder 202. The fixed portion 102b is engaged with the side plate 101. The hexagonal hole 102c is used for rotating the main mirror rotating shaft bearing 102 about the x-axis. Although detailed description will be given hereinafter, by rotating the main mirror rotating shaft bearing 102 about the x-axis, it is possible to adjust the position of the first rotating shaft 202a on a y-z plane, and thereby adjust the angle of the main mirror 201.

Figure 9:
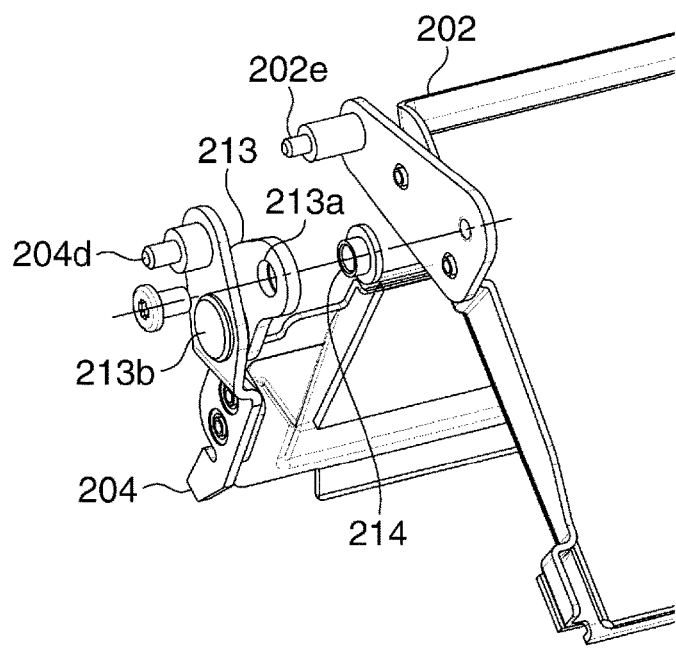
FIG. 9 is an exploded perspective view of a second mirror drive link unit as a component of the mirror drive device.

FIG. 9 is an exploded perspective view of the second mirror drive link unit 206. A second mirror drive link 213 as one of the connecting members includes a main mirror engagement portion 213a and a sub mirror-connecting portion 213b. The second mirror drive link 213 is rotatably attached to the main mirror holder 202 via the main mirror engagement portion 213a which is fitted on a cylindrical member 214. Further, the second mirror drive link 213 is rotatably fitted to the sub mirror holder 204 via the sub mirror-connecting portion 213b.

In the mirror drive device 5, the first mirror drive link unit 205 and the second mirror drive link unit 206 are disposed separately on the opposite sides of the mirror unit 200 in the x-axis direction. This makes it possible to improve driving stability during driving of the mirror unit 200 at high speed. Further, it is possible to distribute loads applied to the first mirror drive link unit 205 and the second mirror drive link unit 206, respectively, which makes it possible to improve the durability.

In a case where it is unnecessary to drive the mirror unit 200 at high speed, the mirror unit 200 may be driven by at least only one of the first mirror drive link unit 205 and the second mirror drive link unit 206. For example, in a case where the mirror unit 200 is driven only by the first mirror drive link unit 205, it is unnecessary to provide a space for arranging the second mirror drive link unit 206, which makes it possible to reduce the size of the camera body 1A, and further, the reduction of the number of components makes it possible to reduce the costs. As another example of the arrangement, the main mirror 201 and the sub mirror 203 may be connected only by the second mirror drive link 213 without providing the first mirror drive link 209. In this case, it is unnecessary to provide a space for arranging the first mirror drive link 209, which makes it possible to make the motor 301 closer to the mirror, whereby it is possible to increase the degree of freedom in designing the layout of the various components in the camera body 1A.

Figure 10A:
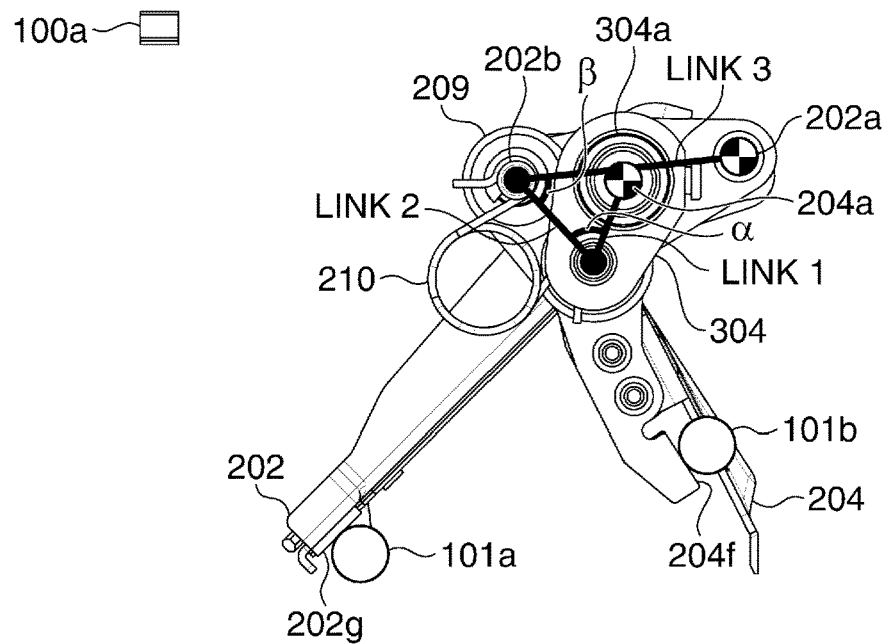
FIGS. 10A and 10B are a side view of the mirror unit in a mirror-down position, and a side view of the mirror unit immediately after a mirror-up operation is started, respectively.

Next, a description will be given of the mirror-up operation and the mirror-down operation of the mirror drive device 5. FIG. 10A is a side view of the mirror unit 200 in the mirror-down position (as viewed from the x-axis direction). Similar to FIG. 7A, thick solid lines in FIG. 10A schematically represent the four-joint link mechanism of the first mirror drive link unit 205.

When the mirror unit 200 is in the mirror-down position, the drive member 304 is held by a holding torque of the motor 301 so as not to rotate about the first rotating shaft 204a and the second rotating shaft 204d of the sub mirror holder 204. Further, since the drive lever 304b is engaged with the sub mirror drive shaft 204b of the sub mirror holder 204, rotation of the sub mirror holder 204 about the first rotating shaft 204a is restricted. Further, the first contact portion 204f of the sub mirror holder 204 is in contact with the sub mirror-positioning shaft 101b of the side plate 101, and the second contact portion 204g of the sub mirror holder 204 is in contact with the sub mirror-positioning shaft 103b of the adjustment plate 103. Since the sub mirror-connecting portion 209b of the first mirror drive link 209 is fitted on the sub mirror drive shaft 204b of the sub mirror holder 204, and the main mirror-connecting portion 209a of the first mirror drive link 209 is fitted on the main mirror drive shaft 202b of the main mirror holder 202, the position of the main mirror holder 202 is restricted by the first mirror drive link 209. As a result, a state is maintained in which the first contact portion 202g of the main mirror holder 202 is in contact with the main mirror-cushioning shaft 101a of the side plate 101, and the second contact portion 202h of the same is in contact with the main mirror-cushioning shaft 103a of the adjustment plate 103.

As shown in FIG. 10A, the four-joint link mechanism of the first mirror drive link unit 205 is arranged such that an angle α formed by the link 1 and the link 2, and an angle β formed by the link 2 and the link 3 are both made approximately equal to 60 degrees. This makes it possible to increase the transmission efficiency of a driving force, compared with a case where the link mechanism is arranged to have an extremely acute angle or obtuse angle, whereby it is possible to reduce load on the motor 301 when the mirror-up operation is started. That is, it is possible to increase the responsiveness at the start of the mirror-up operation. When the motor 301 is started, and the mirror drive device 5 starts the mirror-up operation, the state shown in FIG. 10A shifts to a state shown in FIG. 10B.

Figure 10B:
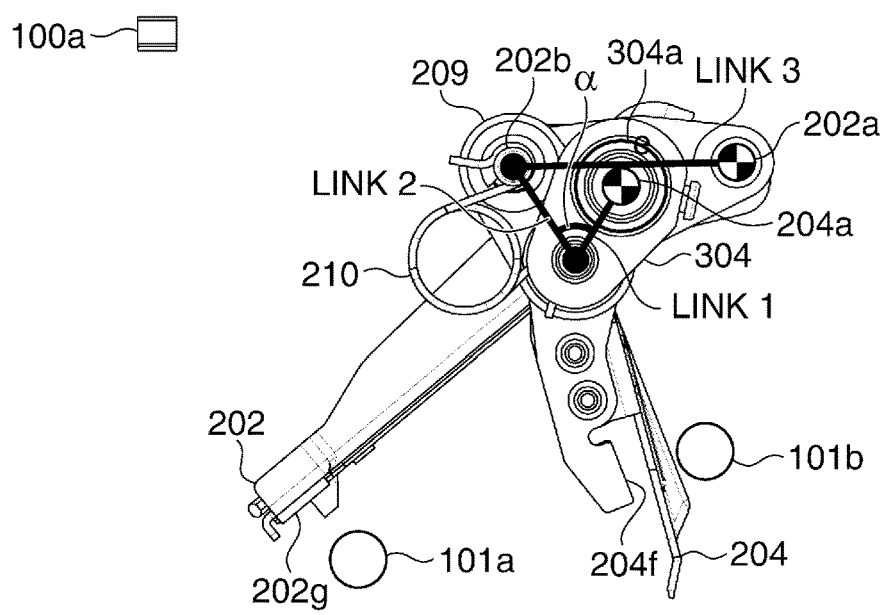

FIG. 10B is a side view of the mirror unit 200 immediately after the mirror-up operation is started, as viewed from the x-axis direction. Similar to FIG. 10A, thick solid lines in FIG. 10B schematically represent the four-joint link mechanism of the first mirror drive link unit 205. As described above, the output shaft 301a of the motor 301, and the first rotating shaft 204a and the second rotating shaft 204d of the sub mirror holder 204 are substantially coaxially disposed along the x-axis direction. Further, the drive lever 304b provided on the drive member 304 fixed to the output shaft 301a is fitted on the sub mirror drive shaft 204b of the sub mirror holder 204. Therefore, when the drive member 304 is slightly rotated from the mirror-down position, the sub mirror holder 204 is rotated by the drive lever 304b about the first rotating shaft 204a and the second rotating shaft 204d by the same angle as that of rotation of the motor 301. At this time, the first contact portion 204f and the second contact portion 204g of the sub mirror holder 204 are moved away from the sub mirror-positioning shafts 101b and 103b, respectively. Further, the main mirror holder 202 is rotated about the first rotating shaft 202a and the second rotating shaft 202e via the first mirror drive link 209. As a result, the first contact portion 202g and the second contact portion 202h of the main mirror holder 202 are moved away from the main mirror-cushioning shafts 101a and 103a, respectively.

Figure 11A:
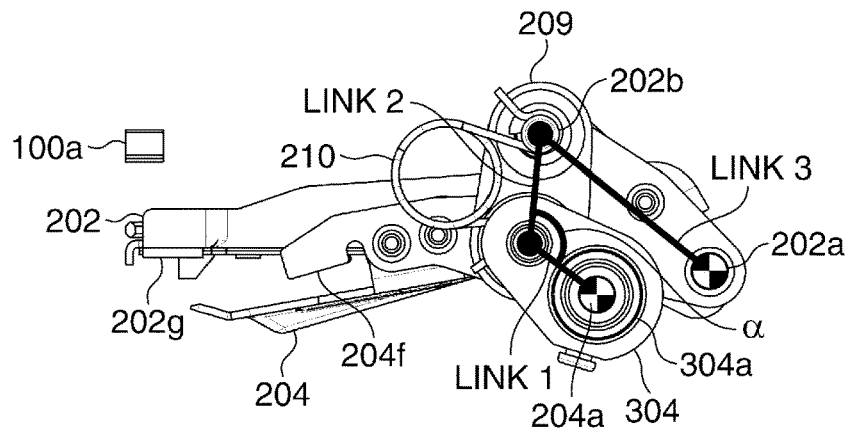
FIGS. 11A and 11B are a side view of the mirror unit immediately before reaching a mirror-up position, and a side view of the mirror unit in the mirror-up position, respectively.

When the mirror-up operation of the mirror drive device 5 further proceeds from the state shown in FIG. 10B, the state shown in FIG. 10B shifts to a state shown in FIG. 11A. FIG. 11A is a side view of the mirror unit 200 immediately before reaching the mirror-up position (as viewed from the x-axis direction). Similar to FIG. 10B, thick solid lines in FIG. 11A schematically represent the four-joint link mechanism of the first mirror drive link unit 205. The drive member 304 driven by the motor 301 further rotates from the state shown in FIG. 10B toward its mirror-up position. The sub mirror holder 204 is rotated about the first rotating shaft 204*a* and the second rotating shaft 204*d* by the drive lever 304*b* of the drive member 304. Further, the main mirror holder 202 is also rotated about the first rotating shaft 202*a* and the second rotating shaft 202*e*.

As described above, the output shaft 301*a* of the motor 301, and the first rotating shaft 204*a* and the second rotating shaft 204*d* of the sub mirror holder 204 are substantially coaxially disposed along the x-axis direction. Further, the drive member 304 fixed to the output shaft 301*a* and the sub mirror holder 204 are connected to each other without using any other mechanical element, such as a gear or a cam. Therefore, it is possible to transmit a force applied during deceleration of the motor 301 without delay. Further, since the rotation angle of the motor 301 and the rotation angle of the sub mirror holder 204 correspond to each other in one-to-one relation, by stopping the motor 301, it is possible to stop the sub mirror 203 (the sub mirror holder 204) without bouncing.

As shown in FIG. 11A, the angle α formed by the link 1 and the link 2 is changed to an obtuse angle (approximately 120 degrees in the present example) immediately before the mirror unit 200 reaches the mirror-up position, and the links 1 and 2 are in a state just before a top dead center in which the link 1 and the link 2 are aligned in a straight line. At this time, an amount of rotation of the link 3 relative to an amount of rotation of the link 1 becomes smaller, and hence even when the rotational angular speed of the motor 301 is constant, the rotational angular speed of the link 3 is reduced immediately before the mirror-up operation is completed. With this, when the motor 301 is braked in the state shown in FIG. 11A, it is possible to more effectively brake the main mirror holder 202. Further, since the looseness of the connecting portion between the link 1 and the link 2 and the looseness of the connecting portion between the link 2 and the link 3 are suppressed by the third looseness elimination spring 210, it is possible to transmit a force of the motor 301 to the main mirror holder 202 without delay. Thus, it is possible to reduce the speed of the main mirror holder 202 before the main mirror holder 202 collides against the mirror-up stoppers 100*a*, whereby it is possible to suppress bouncing of the main mirror 201 (main mirror holder 202) when the main mirror 201 reaches the mirror-up position. Since it is possible to suppress bouncing of the main mirror 201 to a small degree, it is possible to quickly shift the camera to an exposure operation, and thereby improve the continuous shooting speed, and further, it is possible to reduce the impact felt by a photographer during photographing.

Figure 11B:
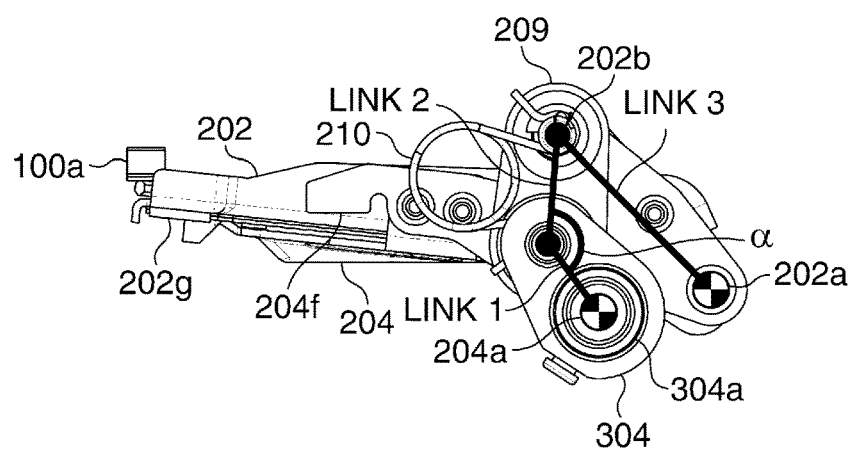

When the mirror-up operation of the mirror unit 200 proceeds from the state shown in FIG. 11A, the state shown in FIG. 11A shifts to a state shown in FIG. 11B. FIG. 11B is a side view of the mirror unit 200 in the mirror-up position (as viewed from the x-axis direction). Similar to FIG. 11A, thick solid lines in FIG. 11B schematically represent the four-joint link mechanism of the first mirror drive link unit 205.

When the mirror unit 200 is in the mirror-up position, the drive member 304 is held by the holding torque of the motor 301 so as not to rotate about the first rotating shaft 204*a* and the second rotating shaft 204*d* of the sub mirror holder 204.

Further, since the drive lever 304*b* is engaged with the sub mirror drive shaft 204*b* of the sub mirror holder 204, rotation of the sub mirror holder 204 about the first rotating shaft 204*a* and the second rotating shaft 204*d* is restricted. The position of the main mirror holder 202 is restricted by the first mirror drive link 209, and the main mirror holder 202 is in contact with the mirror-up stoppers 100*a*, and the sub mirror holder 204 is in contact with the sub mirror contact portions 202*i* of the main mirror holder 202.

When the mirror unit 200 is in the mirror-up position, the angle α formed by the link 1 and the link 2 is larger than that in the state shown in FIG. 11A, but is smaller than 180 degrees. Therefore, the angle α does not exceed the top dead center, and the link 3 is prevented from returning (being rotated in a direction opposite to the direction of rotation of the link 1). While the mirror unit 200 is shifted from the mirror-down position to the mirror-up position, the sub mirror 203 (sub mirror holder 204) is rotated through approximately 123 degrees, and the main mirror 201 (main mirror holder 202) is rotated through approximately 51 degrees, respectively. In short, the rotatable range of the sub mirror holder 204 is larger than that of the main mirror holder 202.

When the mirror unit 200 reaches the mirror-up position, an exposure operation is performed, an incident light flux having passed through the interchangeable lens 2 forms an image on the image pickup sensor 6. When the exposure operation is completed, the motor 301 drives the mirror unit 200 to start the mirror-down operation for moving from the mirror-up position to the mirror-down position. When the mirror-down operation is started, the state shown in FIG. 11B shifts to the state shown in FIG. 11A. First, the drive member 304 is slightly rotated from the state shown in FIG. 11B, and the sub mirror holder 204 is rotated about the first rotating shaft 204*a* and the second rotating shaft 204*d* by the drive lever 304*b*. In accordance with this, the sub mirror holder 204 is moved away from the sub mirror contact portions 202*i* of the main mirror holder 202, and the main mirror holder 202 is rotated about the first rotating shaft 202*a* and the second rotating shaft 202*e* via the first mirror drive link 209. With this, the main mirror holder 202 is moved away from the mirror-up stoppers 100*a*.

When the mirror-down operation of the mirror unit 200 further proceeds from the state shown in FIG. 11A, the state shown in FIG. 11A shifts to the state shown in FIG. 10B. When the drive member 304 is further driven by the motor 301 for rotation from the state shown in FIG. 11A, the sub mirror holder 204 is rotated about the first rotating shaft 204*a* and the second rotating shaft 204*d* by the drive lever 304*b*. Further, the main mirror holder 202 is rotated about the first rotating shaft 202*a* and the second rotating shaft 202*e* via the first mirror drive link 209.

The angle α formed by the link 1 and the link 2 is changed to an acute angle immediately before the mirror unit 200 reaches the mirror-down position. As the angle α formed by the link 1 and the link 2 becomes smaller, an amount of rotation of the link 3 relative to an amount of rotation of the link 1 becomes smaller. That is, even when the rotational angular speed of the motor 301 is constant, the rotational angular speed of the link 3 is reduced immediately before reaching the mirror-down position. With this, in the state shown in FIG. 10B, when the motor 301 is braked, it is possible to more effectively brake the rotation of the main mirror holder 202. Further, since the looseness of the connecting portion between the link 1 and the link 2 and the looseness of the connecting portion between the link 2 and the link 3 are suppressed by the first looseness elimination spring 207, it is possible to transmit a force of the motor 301 to the main mirror holder 202 without delay. That is, it is possible to reduce the speed of the main mirror holder 202 before the main mirror holder 202 collides against the main mirror-cushioning shafts 101a and 103a, and thereby suppress bouncing of the main mirror 201 (main mirror holder 202) when the main mirror 201 reaches the mirror-down position. This makes it possible to reduce the time taken before the viewfinder image is stabilized.

Further, since the sub mirror holder 204 is directly driven by the drive member 304, it is possible to transmit the rotational driving force of the motor 301 without delay. That is, it is possible to reduce the rotational speed of the sub mirror holder 204 immediately before the sub mirror holder 204 collides against the sub mirror-positioning shafts 101b and 103b, and thereby suppress occurrence of bounce of the sub mirror 203 (sub mirror holder 204) when the sub mirror 203 reaches the mirror-down position. This makes it possible to quickly shift the operation of the camera to the focusing operation. As described above, it is possible to reduce time required for the mirror-up operation and the mirror-down operation, whereby it is possible to improve the continuous shooting speed. When the mirror-down operation of the mirror unit 200 further proceeds from the state shown in FIG. 10B, the mirror unit 200 returns to the mirror-down position shown in FIG. 10A. When the mirror unit 200 returns to the mirror-down position to cause an incident light flux having passed through the interchangeable lens 2 to be guided to the optical viewfinder unit 4 and the focus detection unit 3, it is made possible to perform various sensing operations for the next shooting.

Incidentally, in the mirror drive device 5 of the digital single-lens reflex camera, such as the image pickup apparatus 1, high accuracy is required for the mirror angles of the main mirror 201 and the sub mirror 203 in the respective mirror-down positions. This is because the accuracy of the angle of the main mirror 201 affects a matching rate between an image to be shot by the image pickup sensor 6 and an image which can be viewed by a photographer who looks into the viewfinder, and further, the accuracy of the angle of the sub mirror 203 affects the accuracy of focusing. Therefore, the mirror drive device 5 is equipped with a mirror angle adjustment mechanism, and the following description is given of the mirror angle adjustment mechanism of the mirror drive device 5.

Figure 12A:
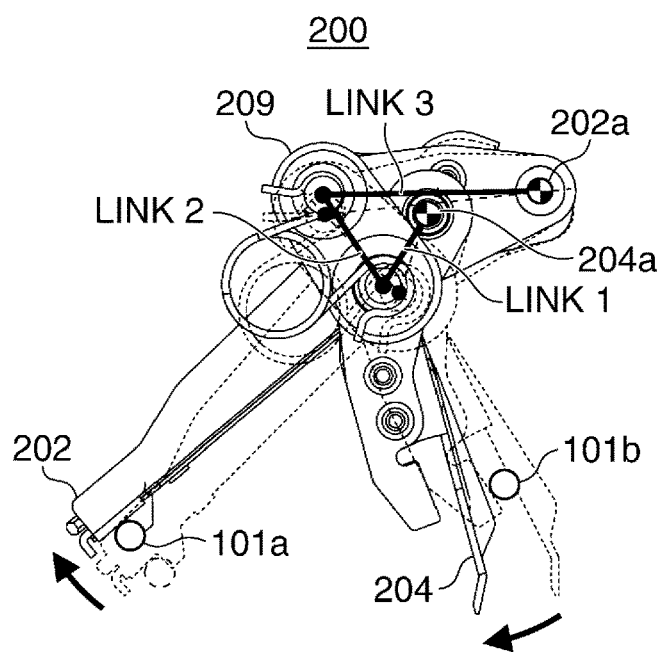
FIGS. 12A and 12B are diagrams useful in explaining a mechanism for adjusting a mirror angle in the mirror-down position.
Figure 12B:
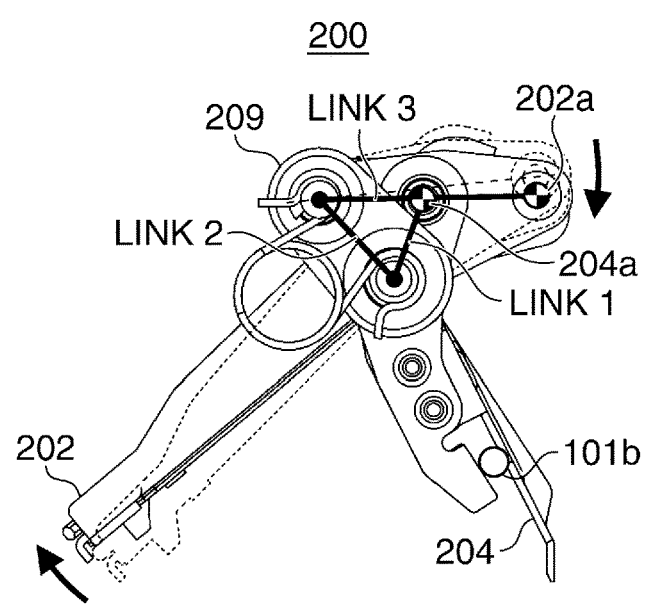

FIG. 12A is a side view useful in explaining a method of adjusting the mirror angle in the mirror-down position using the main mirror-cushioning shaft 101a. FIG. 12B is a side view useful in explaining a method of adjusting the mirror angle in the mirror-down position using the main mirror rotating shaft bearing 102. The main mirror-cushioning shaft 101a with which the main mirror holder 202 is brought into contact when the mirror unit 200 is in the mirror-down position is an eccentric pin. When the main mirror-cushioning shaft 101a is rotated about the x-axis, the main mirror-cushioning shaft 101a is moved in a manner drawing an arc on a y-z plane, as viewed from the x-axis direction. Therefore, by moving the position of the main mirror-cushioning shaft 101a, it is possible to adjust the angle of the main mirror 201, and at this time, as shown in FIG. 12A, all of the link 1, the link 2, and the link 3 are moved, and hence the angle of the sub mirror 203 is also changed. Therefore, in the mirror angle adjustment using the main mirror-cushioning shaft 101a, it is impossible to adjust the angles of the main mirror 201 and the sub mirror 203 independently of each other.

On the other hand, when the main mirror rotating shaft bearing 102 is rotated about the x-axis, as shown in FIG. 12B, it is possible to adjust the position of the bearing portion 102a of the main mirror rotating shaft bearing 102 within the y-z plane, as viewed from the x-axis direction. This makes it possible to adjust the position of the first rotating shaft 202a of the main mirror holder 202, which is fitted in the bearing portion 102a, within the y-z plane, as viewed from the x-axis direction. The main mirror rotating shaft bearing 102 is eccentric in the direction of the link 3, and hence when the main mirror rotating shaft bearing 102 is rotated from the state shown in FIGS. 7A and 7B, the position of the first rotating shaft 202a is moved in a direction substantially orthogonal to the link 3 within the y-z plane. Here, it is desirable that a moving path of the first rotating shaft 202a on the y-z plane extends along a circle about the main mirror drive shaft 202b. In this case, when the main mirror rotating shaft bearing 102 is rotated, in the state shown in FIGS. 7A and 7B or in a state close to the state shown in FIGS. 7A and 7B, the link 3 is moved as shown in FIG. 12B, but the link 1 is not moved. Therefore, it is possible to adjust only the angle of the main mirror 201 without affecting the angle of the sub mirror 203.

In the actual mirror angle adjustment, first, the sub mirror-positioning shafts 101b and 103b are rotated about the x-axis to thereby adjust the angle of the sub mirror 203 (sub mirror holder 204). Then, the main mirror rotating shaft bearing 102 is rotated about the x-axis to thereby adjust the angle of the main mirror 201 (main mirror holder 202). Next, the position of the sub mirror holder 204 is held, and the main mirror-cushioning shafts 101a and 103a are rotated about the x-axis such that the main mirror-cushioning shafts 101a and 103a are brought into contact with the first contact portion 202g and the second contact portion 202h of the main mirror holder 202. This makes it possible to adjust the angles of the main mirror 201 and the sub mirror 203 independently of each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, the image pickup apparatus 1 is not limited to the digital single-lens reflex camera, but may be a single-lens reflex film camera.

This application claims the benefit of Japanese Patent Application No. 2016-149845 filed Jul. 29, 2016, which is hereby incorporated by reference herein in its entirety.

What is claimed is:

1. A mirror drive device comprising:
a support member;
a main mirror;
a main mirror holder that has a main mirror rotating shaft rotatably supported by the support member, and holds the main mirror in a manner rotatable between a first position and a second position;
a sub mirror that reflects a light flux having transmitted through the main mirror;
a sub mirror holder that has a sub mirror rotating shaft rotatably supported by the support member, and holds the sub mirror in a manner rotatable between a third position and a fourth position;
at least one connecting member that connects the main mirror holder and the sub mirror holder; and
a drive member that is engaged with the connecting member, and is driven for rotation by a motor, wherein the sub mirror holder is directly driven by the drive member, and the main mirror holder is driven by the drive member via the connecting member.

2. The mirror drive device according to claim 1, wherein an output shaft of the motor and the sub mirror rotating shaft are substantially coaxially disposed.

3. The mirror drive device according to claim 1, wherein the connecting member includes,
   a first connecting portion that is connected to the main mirror holder, and
   a second connecting portion that is connected to the sub mirror holder, and
   wherein an angle formed by a straight line connecting between the sub mirror rotating shaft and the second connecting portion and a straight line connecting between the first connecting portion and the second connecting portion is an acute angle when the main mirror holder is in the first position and the sub mirror holder is in the third position, and is an obtuse angle when the main mirror holder is in the second position and the sub mirror holder is in the fourth position.

4. The mirror drive device according to claim 3, wherein an angle formed by the straight line connecting between the first connecting portion and the second connecting portion and a straight line connecting between the main mirror rotating shaft and the first connecting portion is an acute angle when the main mirror holder is in the first position, and the sub mirror holder is in the third position.

5. The mirror drive device according to claim 4, wherein an angle formed by the straight line connecting between the sub mirror rotating shaft and the second connecting portion, and the straight line connecting between the first connecting portion and the second connecting portion, and an angle formed by the straight line connecting between the first connecting portion and the second connecting portion, and the straight line connecting between the main mirror rotating shaft and the first connecting portion are each approximately 60 degrees, when the main mirror holder is in the first position, and the sub mirror holder is in the third position.

6. The mirror drive device according to claim 3, wherein the main mirror holder includes a main mirror drive shaft that is fitted in the first connecting portion,
   wherein the sub mirror holder includes a sub mirror drive shaft that is rotatably fitted in the second connecting portion,
   wherein the drive member includes a drive lever that is rotatably fitted in the sub mirror drive shaft,
   the mirror drive device further including an urging member that is engaged with the main mirror drive shaft and the drive lever, and urges the main mirror drive shaft and the drive lever in a direction away from each other, respectively, and
   wherein the urging member eliminates looseness at three points between the main mirror drive shaft and the first connecting portion, between the drive lever and the sub mirror drive shaft, and between the sub mirror drive shaft and the second connecting portion.

7. The mirror drive device according to claim 1, wherein the at least one connecting member comprises two connecting members disposed opposed to each other with the main mirror holder and the sub mirror holder therebetween.

8. The mirror drive device according to claim 1, wherein the support member includes an eccentric bearing that supports the main mirror rotating shaft, and
   wherein by rotating the eccentric bearing about a central axis thereof, the first position can be adjusted.

9. An image pickup apparatus comprising:
   a camera body;
   a mirror box that is arranged on a photographing optical path of the camera body;
   a main mirror;
   a main mirror holder that has a main mirror rotating shaft rotatably supported by the mirror box, and holds the main mirror in a manner rotatable between a mirror-down position where the main mirror blocks the photographing optical path and a mirror-up position where the main mirror is retracted from the photographing optical path;
   a sub mirror that reflects a light flux having transmitted through the main mirror;
   a sub mirror holder that has a sub mirror rotating shaft rotatably supported by the mirror box, and holds the sub mirror in a manner rotatable between a mirror-down position where the sub mirror blocks the photographing optical path and a mirror-up position where the sub mirror is retracted from the photographing optical path;
   at least one connecting member that connects the main mirror holder and the sub mirror holder;
   a motor that outputs a rotational driving force; and
   a drive member that is engaged with the connecting member and is driven for rotation by the motor,
   wherein the sub mirror holder is directly driven by the drive member to rotate between the mirror-down position and the mirror-up position, and the main mirror holder is driven by the drive member via the connecting member to rotate between the mirror-down position and the mirror-up position.

10. An image pickup apparatus comprising:
    a support member;
    a first mirror;
    a first mirror holder that has a first rotational shaft rotatably supported by the support member, and holds the first mirror;
    a second mirror that reflects a light flux having transmitted through the main mirror;
    a second mirror holder that has a second rotating shaft rotatably supported by the support member, and holds the second mirror;
    a connecting member that connects the first mirror holder and the second mirror holder; and
    a drive member that is driven for rotation by a motor,
    wherein the connecting member includes a first connecting portion connected to the first mirror holder, and a second connecting portion connected to the second mirror holder, and the first connecting portion and the second connecting portion are fixed to respective predetermined locations of the connecting member,
    wherein the first mirror holder is rotated about the first rotating shaft by the connecting member being moved by being urged by the drive member, and
    wherein the second mirror holder is rotated about the second rotating shaft by being urged by the drive member.

11. The image pickup apparatus according to claim 10, wherein a rotating shaft of the drive member and the second rotating shaft are substantially coaxially disposed.

12. The image pickup apparatus according to claim 10, wherein a rotatable range of the second mirror holder is larger than a rotatable range of the first mirror holder.

13. The image pickup apparatus according to claim 10, wherein an angle formed by a straight line connecting between the first connecting portion and the second connecting portion and a straight line connecting between a rotating shaft of the drive member and the second connecting portion changes as the drive member rotates.

14. The image pickup apparatus according to claim 10, wherein an angle formed by a straight line connecting between the first connecting portion and the second connecting portion and a straight line connecting between a rotating shaft of the drive member and the second connecting portion does not exceed 180 degrees.

\* \* \* \* \*